(No Model.)
C. F. SMALLEY.
GUIDE ATTACHMENT FOR DRAG SAWS.
No. 532,828. Patented Jan. 22, 1895.
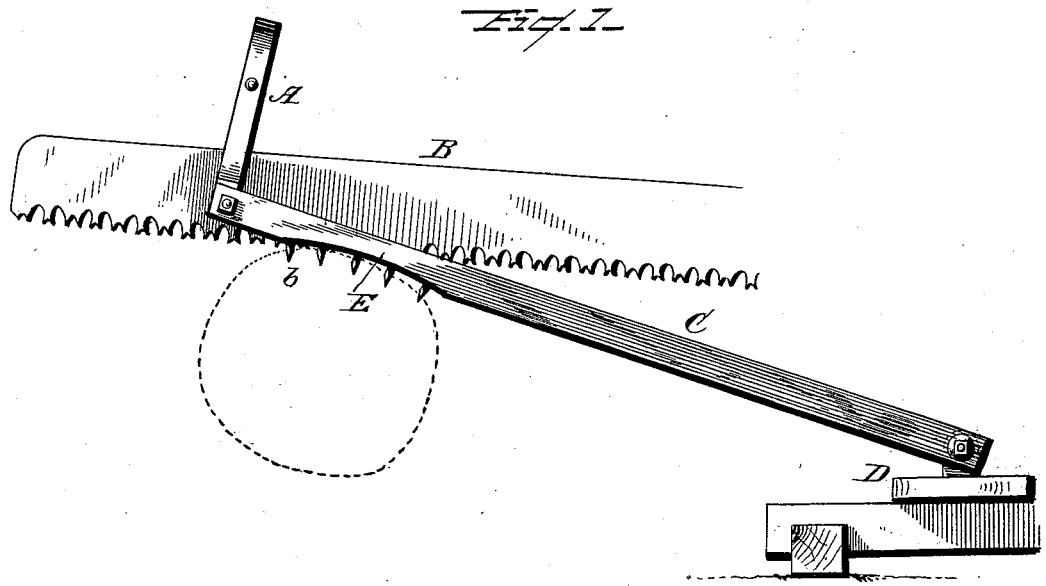
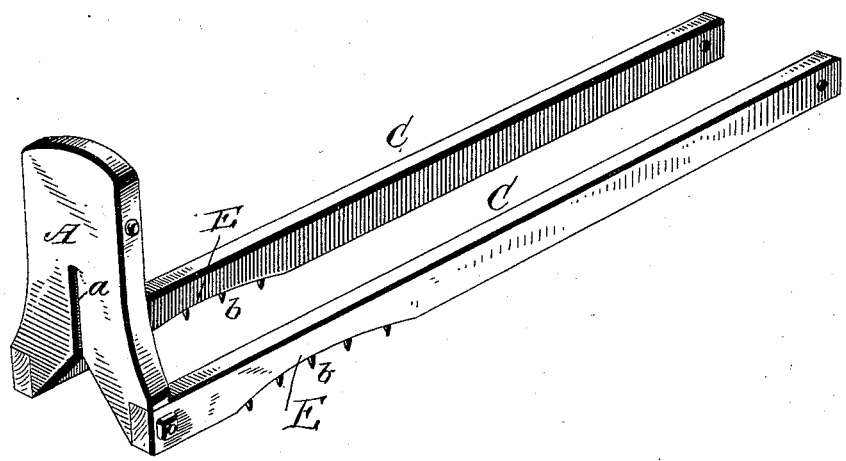
Witnesses
C. J. Williamson
Chas. P. Goodwin
Inventor
Charles F. Smalley.
per Chas. H. Fowler,
Attorney.
THE NORRIS PETERS CO., PHOTO-LITHO., WASHINGTON, D. C.

UNITED STATES PATENT OFFICE.

CHARLES FREMONT SMALLEY, OF MANITOWOC, WISCONSIN.

GUIDE ATTACHMENT FOR DRAG-SAWS.

SPECIFICATION forming part of Letters Patent No. 532,828, dated January 22, 1895.

Application filed December 26, 1893. Serial No. 494,698. (No model.)

*To all whom it may concern:*

Be it known that I, CHARLES FREMONT SMALLEY, a citizen of the United States, residing at Manitowoc, in the county of Manitowoc and State of Wisconsin, have invented certain new and useful Improvements in Guide Attachments for Drag-Saws; and I do hereby declare that the following is a full, clear, and exact description of the same, reference being had to the annexed drawings, making a part of this specification, and to the letters of reference marked thereon.

The present invention has for its object to provide a suitable guide attachment for the drag-saws of sawing machines that will be simple and inexpensive in its construction and will possess the required effectiveness in holding the saw steady when in motion and preventing its swaying or wabbling while the log or other timber is fed up for a new cut and also providing in conjunction with the guide simple and effective means for holding and keeping steady the log until the saw has completed its cut. These several objects I attain by an attachment constructed substantially as shown in the drawings and hereinafter described and claimed.

Figure 1 of the drawings represents a side elevation of my improved attachment showing the saw in engagement with the guide and the log in dotted lines; Fig. 2, a perspective view of the guide-attachment constructed in accordance with my invention.

In the accompanying drawings A represents the guide having the slot *a* with which engages the saw B until the saw has cut into the log or other timber a sufficient distance, when the cut in the log itself will act as a guide for the saw.

The guide A is provided with two parallel arms C which are disposed at right angles thereto and connected to the guide by bolts or other suitable fastenings, said arms at their free ends being suitably connected to the frame of the machine as shown at D. The arms C at the ends which join the guide A are provided with a curved or concave bearing E so as to better adapt them to the convexity of the log being sawed, said bearing having spurs *b* to enter the log and hold it steady.

The employment of the parallel arms C with the concave bearings E and spurs *b*, provide a very practical effective means for holding the log steady after the saw leaves the guide A, thus combining both a saw-guide and log holder in one and the same attachment. As soon as the saw has cut into the log a short distance, the log will form the guide by taking the place of the guide A and then the concave bearings E of the arm C and the spurs *b* will act as the log holder and serve to keep the log steady until the saw has completed the cut, after which the saw is lifted to engage with the slot in the guide to keep the saw from moving laterally or swaying from side to side.

The two parallel arms C perform a double function, serving the purpose of hangers for the slotted guide A and also means for holding the log steady upon each side of the saw-blade, and for this purpose the arms have concave bearings and spurs *b*, thereby holding the log against movement while the saw is in operation. A further advantage of the attachment is in the slotted guide A, the same being detachably connected to the arms C by means of bolts and nuts or other like fastenings whereby the guide may be removed from the arms should it become broken or otherwise injured to render it useless and a new guide substituted without having to replace the entire attachment.

The arms C as will be seen, are connected to the guide A at the lower end thereof instead of at the top or upper end as heretofore, thereby bringing the arms upon the same horizontal plane with the lower end of the guide and thus enabling said arms to be brought in close contact with the log at the point where the spurs *b* enter and consequently form a better means for steadying the log. The attaching of the arms to the upper end of the guide so increases the distance between the log and arms as to require the necessity of lengthening the pins or spikes to extend down a sufficient distance to engage the log and any lateral movement thereof would tend to bend the pins or spikes out of shape owing to their length. This is entirely avoided by connecting the arms to the guide at its lower end whereby short spurs may be used and the arms brought in close contact with the log to better steady it.

Having now fully described my invention, what I claim as new, and desire to secure by Letters Patent, is—

An attachment for drag-saws, consisting of a slotted guide, two parallel arms detachably connected to the saw frame and having concave bearings with short spurs projecting therefrom, said arms being detachably connected to the guide at its lower end to bring them or the bearings in contact with the log, on the same plane therewith when in use, substantially as and for the purpose set forth.

In testimony that I claim the above I have hereunto subscribed my name in the presence of two witnesses.

CHARLES FREMONT SMALLEY.

Witnesses:
MAX MILSH,
N. NELSON.